(12) United States Patent
Chetrit et al.

(10) Patent No.: US 10,281,664 B1
(45) Date of Patent: May 7, 2019

(54) METHOD FOR DETERMINING A SPATIAL RELATIONSHIP BETWEEN AN OPTOELECTRONIC CHIP AND AN OPTICAL MOUNT

(71) Applicant: DustPhotonics Ltd., Modiin (IL)

(72) Inventors: Yoel Chetrit, Kfar Ben Nun (IL); Mordechai Cabessa, Netanya (IL)

(73) Assignee: DUSTPHONICS LTD., Modiin (IL)

( * ) Notice: Subject to any disclaimer, the term of this patent is extended or adjusted under 35 U.S.C. 154(b) by 0 days.

(21) Appl. No.: 16/052,765

(22) Filed: Aug. 2, 2018

Related U.S. Application Data

(63) Continuation-in-part of application No. 15/796,860, filed on Oct. 30, 2017.

(51) Int. Cl.
  *G02B 6/42* (2006.01)
  *G01B 11/14* (2006.01)

(52) U.S. Cl.
  CPC .......... *G02B 6/4227* (2013.01); *G01B 11/14* (2013.01); *G02B 6/4206* (2013.01); *G02B 6/4295* (2013.01); *G02B 6/4246* (2013.01)

(58) Field of Classification Search
  CPC .. G02B 6/4227; G02B 6/4295; G02B 6/4206; G01S 11/02; G01S 17/89
  See application file for complete search history.

(56) References Cited

U.S. PATENT DOCUMENTS

2002/0084432 A1* 7/2002 Sugiyama ............. G01S 7/4811
  250/559.38

* cited by examiner

*Primary Examiner* — Sung H Pak
*Assistant Examiner* — Hoang Q Tran
(74) *Attorney, Agent, or Firm* — Reches Patents

(57) ABSTRACT

A method for determining a spatial relationship between an optoelectronic chip and an optical mount, the method may include temporarily filling, by a liquid, a gap formed between a lens of the optical mount and the optoelectronic chip, while the optical mount contacts the optoelectronic chip; inspecting an optical component of the optoelectronic chip through the lens and through the liquid that fills the gap; and determining the spatial relationship between the optoelectronic chip and the optical mount based on the outcome of the inspecting of the optical component.

13 Claims, 15 Drawing Sheets

US 10,281,664 B1

METHOD FOR DETERMINING A SPATIAL RELATIONSHIP BETWEEN AN OPTOELECTRONIC CHIP AND AN OPTICAL MOUNT

CROSS REFERENCE

This application is a continuation in part of U.S. patent application Ser. No. 15/796,860 filing date Oct. 30, 2017.

BACKGROUND

Optical devices utilizing optoelectronic chips such as lasers and photodetectors (PD) require coupling the light to and from optical fibers. Such devices can be found for example in telecom or Datacom applications, fiber sensors and various medical diagnostic applications. The complexity of fiber coupling increases significantly as the fiber core diameter decreases since the spot size of the optoelectronic chip needs to be similar to that of the fiber. In addition, the numerical aperture (NA) on both sides should match to allow efficient coupling within the fiber angular acceptance cone. Fibers used in optical communication applications are either multimode or single mode with a core diameter of 50 and 9 micron, respectively.

The small core diameter imposes stringent limitations on the coupling efficiency that are directly affecting the overall cost of the device. In principle, the light from a laser source is routed via a lens to the fiber input face. On the opposite side of the optical link, light coming out from the fiber is focused with a lens such that all of the light is incident on the PD aperture. As Telecom and Datacom data rate increase beyond 25 Gb/s to 50 Gb/s and higher, the apertures of both lasers and PD decrease making fiber coupling more complicated since both the spot size and angular distribution are more difficult to control.

High efficiency fiber coupling can be achieved if an active alignment scheme is used. This scheme involves powering up all electrical and optoelectronic chips on the device and carrying out the alignment while monitoring the laser optical power coupled into the fiber, or by monitoring the photo-current resulting from coupling light from the fiber to the PD. It can be appreciated that active fiber alignment may be a costly and labor-intensive process that may be not suitable to volume production of optical modules.

SUMMARY

There may be provided a method for determining a spatial relationship between an optoelectronic chip and an optical mount, the method may include temporarily filling, by a liquid, a gap formed between a lens of the optical mount and the optoelectronic chip, while the optical mount contacts the optoelectronic chip; inspecting an optical component of the optoelectronic chip through the lens and through the liquid that fills the gap; and determining the spatial relationship between the optoelectronic chip and the optical mount based on the outcome of the inspecting of the optical component.

The liquid may be a volatile liquid.
The liquid may be alcohol.
The filling may include positioning one or more drops of the liquid at a vicinity of the lens and allowing capillary forces to move the one or more drops towards the lens.

The method wherein a refractive index of the lens substantially equals a refractive index of the liquid.

The method may include acquiring a pre-fill image of the lens, before the temporarily filling, by the liquid, the gap; and acquiring a post-fill image of the lens, after the temporarily filling, by the liquid, the gap.

The method may include determining, based on the pre-fill image and the post-fill image, a spatial deviation introduced by the temporarily filling the gap by the liquid; and wherein the determining the spatial relationship may include compensating for the spatial deviation introduced by the temporarily filling the gap by the liquid.

The method may include detecting defects based on a comparison between the pre-fill image and the post-fill image. The defects may be, for example, debris/scratches/adhesives.

The optical component may be a vertical-cavity surface-emitting laser.

The optical component may be a p-i-n photodiode.

The method may include inspecting another optical component of the optoelectronic chip through the lens and through the liquid that fills the gap; and wherein the determining of the spatial relationship may be further based on an outcome of the inspecting of the additional optical component.

The method may include fixing a misalignment between the optoelectronic chip and the optical mount based on the outcome of the inspecting of the optical component.

The method may include determining a quality of an apparatus that may include the optoelectronic chip and the optical mount based on the outcome of the inspecting of the optical component.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Figure 1:
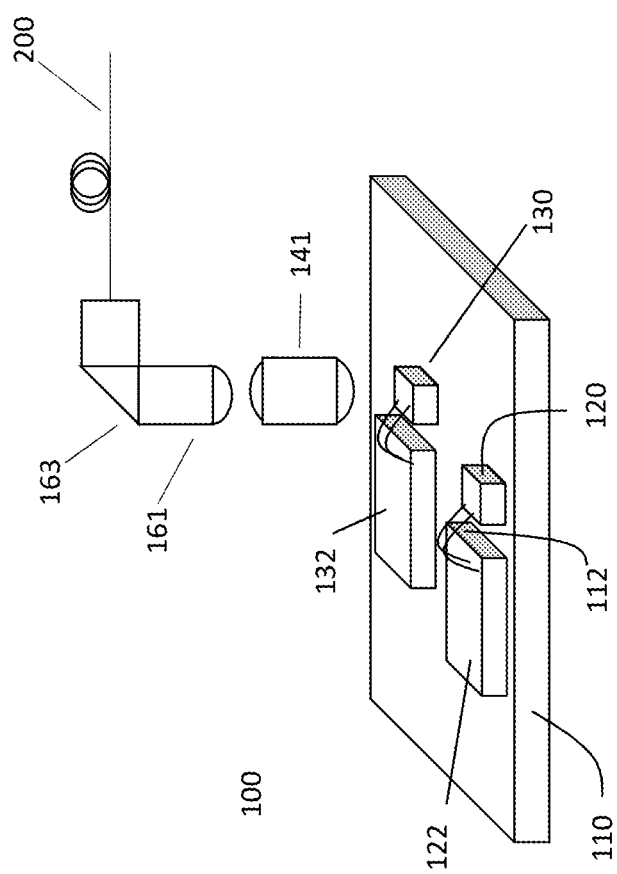
FIG. 1 illustrates an example of a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Passive fiber alignment is much more suited for volume production of optical devices as the process can be carried out with fully automated pick-and-place machines using pre-defined alignment marks to locate the coupling elements. The accuracy of passive alignment depends on the assembly machine accuracy and repeatability as well as on the accuracy of the alignment mark. Passive alignment can lead to significant reduction of the device packaging cost due to the lower operation cost, higher machine throughput and since yields tend to be higher with passive, machine-based alignment.

Multimode optical links employ vertically emitting opto-electronic chips namely, vertical-cavity surface-emitting laser (VCSEL) and vertically illuminated p-i-n PDs. These devices are difficult to align as the lens needs to be mounted above the device and a right angle turn of the fiber is required in order to fit the coupling optics within the transceiver housing. Efficient fiber coupling is possible if all optical elements are co-located on an axis given the 6 degrees of freedom. With active alignment, this can be accomplished in a straight-forward way by moving the fiber and/or lens both lateral and angular along the XYZ axes until good coupling is achieved. With passive alignment, the situation is more complicated since mounting the lens and fiber has no feedback and a method must be devised to avoid tilt and rotation.

The following description of the embodiment is based on an optical transceiver for optical communications. However, the invention is valid for other applications as well in which surface emitting laser and surface illuminated PD are being used.

Referring to FIG. 1, the optical transceiver 100 has a substrate 110, VCSEL 120 and PD 130.

The VCSEL is connected via wire bond 112 to laser driver chip 122 and the PD is connected to a trans-impedance amplifier (TIA) 132. A first lens 141 is mounted above VCSEL 120 and above PD 130. The lens 141 may be of any shape such as bi-convex, plano-convex or concave. A second lens 161 is mounted above lens 141 with one curved surface and a right-angle prism 163 used to fold the light by 90° so that the optical axis is collinear with the fiber 200.

VCSEL 120 and PD 130 may be single elements or in array format, typically four elements are used in communication devices, but any other number common in the industry may be used. The lens 141 may be a part of an array with either the same number of optical apertures or higher. Substrate 110 can be a printed circuit board (PCB) or any other suitable electronic substrate. VCSEL driver chip 122, TIA 132, VCSEL 120 and PD 130 are glued onto the substrate 110 using thermal epoxy glue. The distance between the driver chips and the optical chips is very short to enable short length of wire bond 112. The short wire length is critical for obtaining high frequency operation of the laser and photodiodes.

In one embodiment of this invention, the lens array is fabricated such that it has similar dimensions to both VCSEL 120 and PD 130. Two such lenses are assembled, one above the VCSEL and the other above the PD. Using separate lenses has the advantage that the relative orientation of both VCSEL 120 and PD 130 is not relevant. Fiber alignment is carried out independently for each one. The lens array can be aligned above the laser and photodiode arrays using standard pick-and-place machine. Alignment features on both the lens and the laser or PD are used to facilitate accurate positioning of the lens array. A second lens 142 is located above first lens 141 to assist in the light coupling to or from fiber 200.

Figure 2:
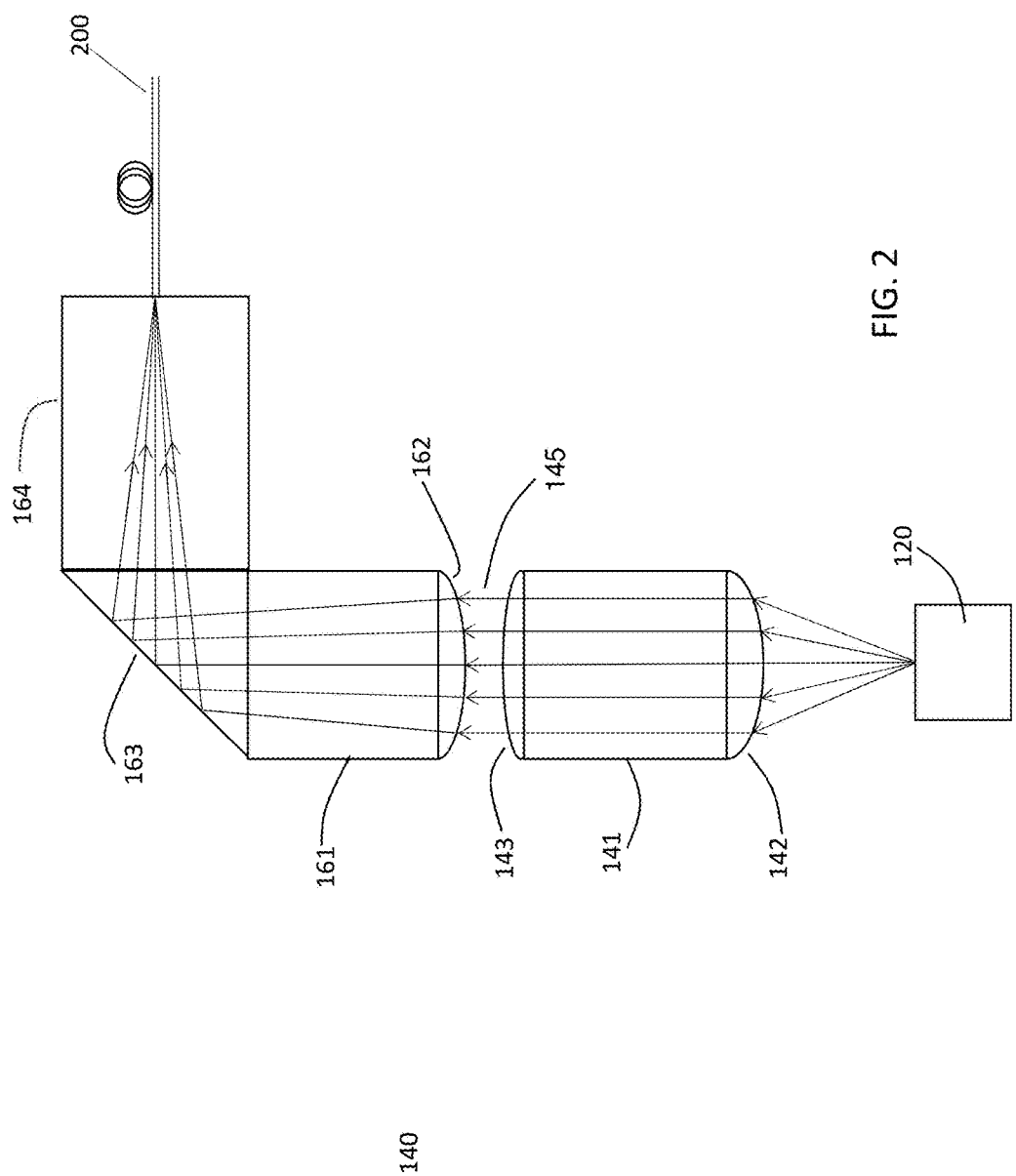
FIG. 2 illustrates a transmit optical path from a transmitting optoelectrical chip to an optical fiber.
Figure 3:
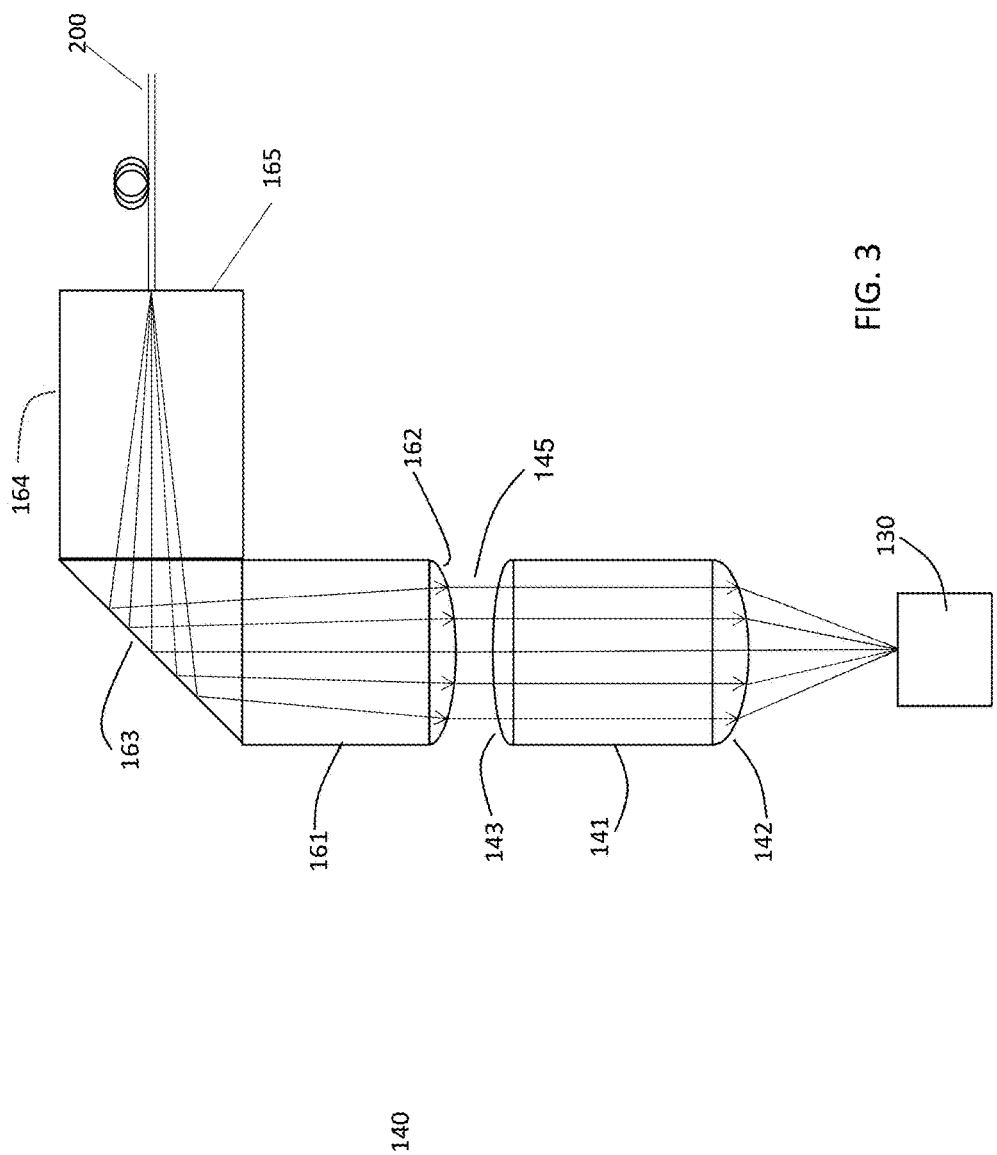
FIG. 3 illustrates a receive optical path from an optical fiber to a receive optoelectrical chip.

FIGS. 2 and 3 illustrates the optical system 140 used for the passive assembly. It is built from two lenses 141 and 161 that function as one optical system. The lens 140 is used for both coupling tasks, VCSEL-to-fiber and fiber-to-PD. Even though the optical path is different in both cases, the design of lens 140 is capable to support both.

In FIG. 2 the optical path from the VCSEL 120 to the fiber 200 is shown; optical surface 142 collects light emitted from VCSEL 120. The surface 142 is designed to collect all the emitted light using an aspherical profile and NA that covers the entire angular distribution of the laser. Minimizing the sensitivity for alignment errors is achieved by designing the optical system as a multi-lens relay that allows for the beam to reach the fiber 200 with minimal distortions due to assembly errors. This task is achieved by broadening the beam to about 200 µm and collimating the light collected using surface 142 and surface 143. The homogenous energy distribution within the broadened beam exhibits minimal sensitivity to misalignment and allows to compensate for tilts and lateral shifts that are inherent to the assembly.

An air gap 145 is located between lens 141 and lens 163; its thickness is determined by the size of the mechanical system used to align and join the two lenses. As the light beam is also collimated in this air space, it shows minimal sensitivity for angular and lateral misalignment between the two elements.

Optical surface 162 collects the light and directs it to the hypotenuse of right angle prism 163. The combined action of surfaces 162, 163 and optical slab 164 is to focus the light tightly on the entry aperture of fiber 200. An underfill launch condition is required to minimize mode excitation achieved by a tightly focused spot on the center of the fiber aperture. Surface 163 may be planner or parabolic or any freeform polynomial surface as required by the optical performance.

FIG. 3 illustrates the optical path from the fiber 200 to PD 130. Light from the fiber 200 is emitted with a NA typical of multimode fibers. Optical surfaces 162, 163 and slab 164 collect the light and shape it such that the beam in air space 145 is fully collimated. Lens 141 focused the light beam onto the PD aperture using optical surface 142. At modulation frequencies of 50 Gb/s using pulse amplitude modulation of 4 or 8 levels, the PD aperture must be minimized to sub-30 μm diameter to maintain the capacitance low enough. The negative magnification required to couple light from the 50 μm fiber core to the PD is the most critical aspect of this invention and obtained using the combined effect of the beam shape and the aspherical profile of surface 142.

Lens system 140 can be fabricated from glass plastic or any suitable material with high transparency at the VCSEL wavelength of 850 nm. If the material is plastic, injection molding may be used to further reduce the device cost. Optical elements 141 and 161 are embedded within a mechanical structure designed to align the lenses passively with respect to the optoelectronic chips or the fibers.

Figure 4B:
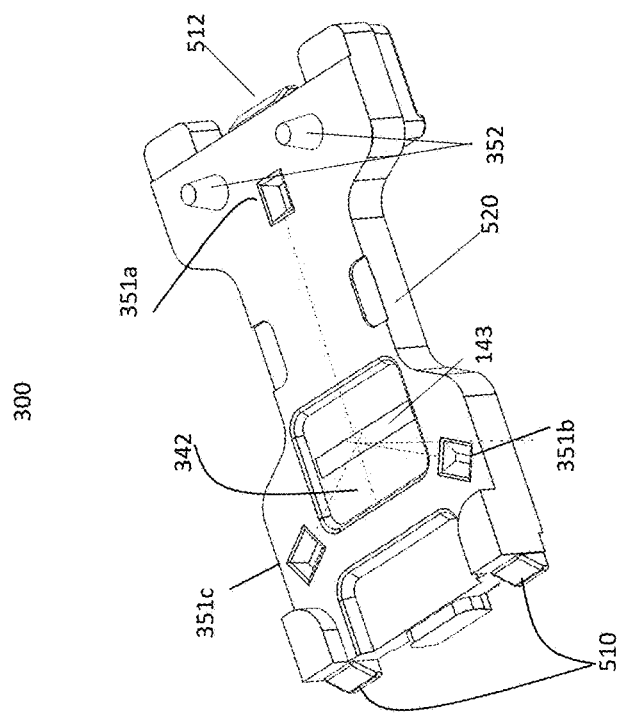
FIGS. 4A-4B are examples of a top view and a bottom view of an optical mount of an electrical coupler.
Figure 4A:
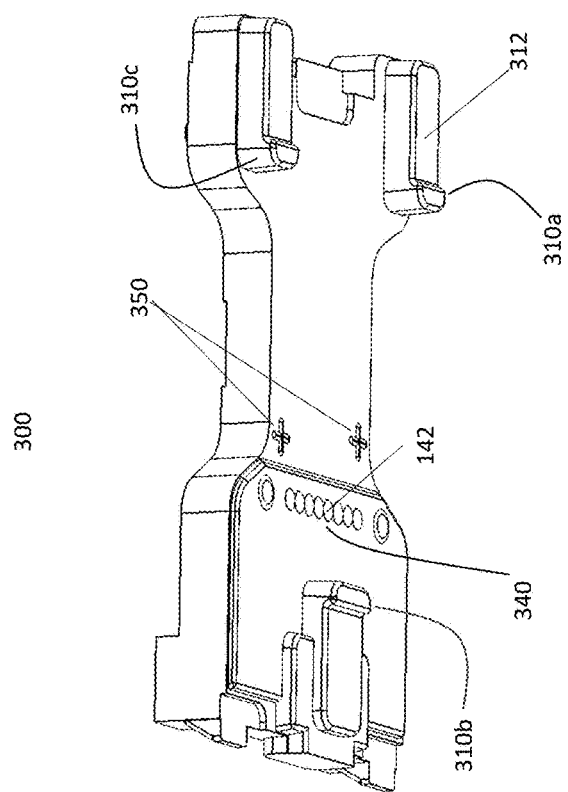

FIGS. 4A and 4B illustrate an optical mount 300 in which lens 141 is enclosed as part of lens array 340.

The bottom side is shown in FIG. 4A with an eight-element lens array 340 where each optical element corresponds to optical lens 141 shown in FIGS. 2 and 3. Typical arrays used in devices for optical communication have four elements per array. Increasing the number of optical lenses 141 to eight, as in this invention, allows freedom to use driver chips from different vendors where the location of the wire bond 112 pads may vary between chips. With a large lens array 340, any combination of VCSEL 120 and driver chip 122 (or PD 130 and TIA chip 132) may be realized even if it implies that the location of the VCSEL (PD) array is shifted laterally with each chip combination.

The optical mount 300 is assembled on the substrate 110 using three legs 310 positioned such that both driver chip 122 (132) and optoelectronic chip 120 (130) can be accommodated in the space created between substrate 110 and optical mount 300. Attachment to the substrate is carried out using a thermal curing epoxy adhesive dispensed on surface 312. The height difference between leg 310 and surface 312 determines the amount of glue used. The adhesion of the epoxy to surface 312 is enhanced by specific treatment of the surface. Accurate alignment of the lens array 340 with respect to VCSEL array 120 or PD array 130 is carried out with a pick-and-place machine using alignment marks 350 whose position with respect to optical lens array 340 is known.

The top side of optical mount 300 is shown in FIG. 4B.

Optical lens array 340 is in a recess 342 with optical surfaces 143. The depth of the recess is determined by the required thickness for lens 141. Rough alignment of optical mount 300 with the fiber ferrule 400 is done using guide pins 352. The three V-shaped slots 351 are part of the accurate alignment mechanism described below for assembly of fiber ferrule 400 on mount 300. The slots 351 are oriented at 120° with respect to each other thus defining a geometrical center.

Figure 5B:
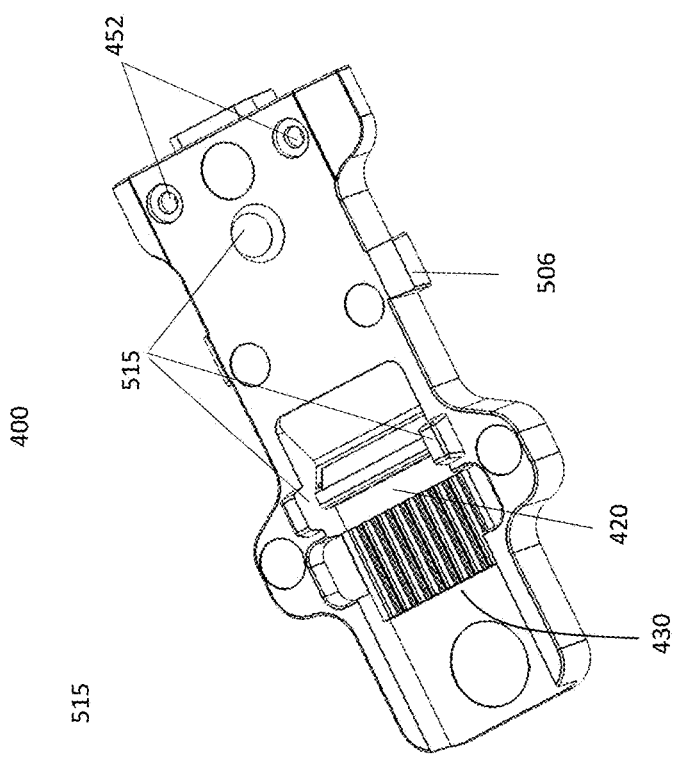
FIGS. 5A-5B are examples of a top view and a bottom view of an optical mount of a fiber ferrule.
Figure 5A:
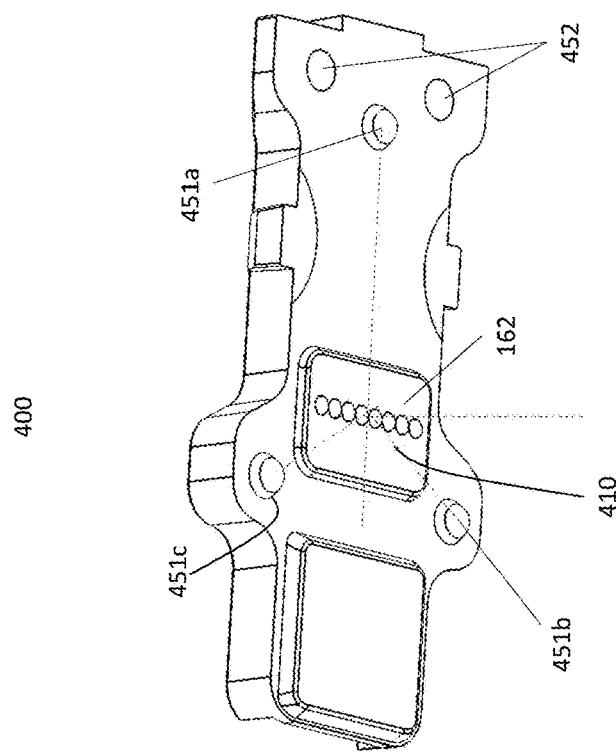

With respect to FIG. 5A, holes 452 allow for guide pins 352 to perform rough mating of optical mount 300 with ferrule 400. Optical lens array 410 has also eight elements each one with lens 162. Accurate alignment of the fiber ferrule 400 on the optical mount 300 is enabled with three balls 451 that self-align onto slots 351 located on the mount. This design overlaps the optical axis of lens array 410 and the optical axis of lens array 340 with the geometric center of the three V-shaped slots 351. The geometrical center location is fully defined and thus its position is fixed even in the case of thermal expansion or mechanical stress. Using V-shaped slots allows to constrain the degrees of freedom. Each slot constrains two degrees of freedom (one per wall) totaling in all six degrees being locked. The ball-slot system allows for alignment of ferrule 400 on mount 300 with sub-micron accuracy.

When the three balls 451a, 451b and 451c are aligned with three grooves 351a, 352b and 352c then the first and second lens arrays are aligned with each other. Furthermore, the first and second lens arrays are located within a center of stability—which is stable (or at least substantially stable) even when the optical coupled device undergoes thermal variations. The first and second lens arrays are relatively stable and thus do not misalign under thermal and/or mechanical stress because the intersection of imaginary longitudinal axes of the three grooves (and an intersection of the three balls) falls on the optical axis of both the first and second optical lens arrays respectively.

In FIG. 5B the top side of the ferrule 400 is shown with a V-groove array 430 that allows for accurate positioning of the fiber ribbon with respect to the optical axis. A fiber ribbon or separate fibers are placed on the v-groove. The fibers terminate on optical surface 165 within enclosure 420 that contains the right-angle prism 163 and lens 162. A drop of optical grade adhesive is used to fix the fibers in place.

Figure 6B:
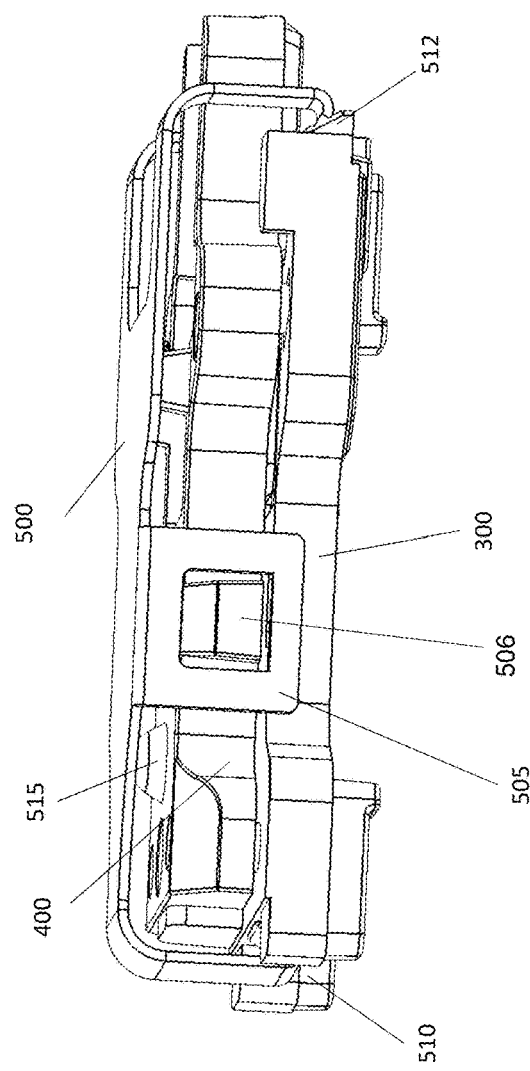
FIG. 6B is an example of a clip that holds the optical mount and the fiber ferrule.
Figure 6A:
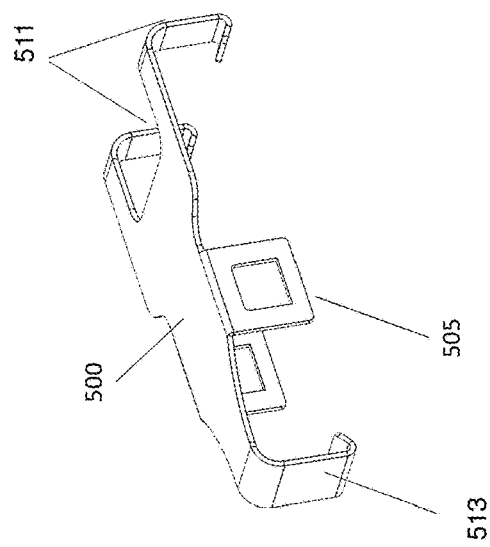
FIG. 6A illustrates an example of a clip.

Attachment of ferrule 400 on mount 300 is carried out using a clip 500 shown in FIG. 6A. The clip may be constructed from metal or other suitable material. It is designed to couple the two optical elements without causing strain. Initial attachment of the clip 500 is done using flexible flange 505 that clips onto slab 506. The reason for this preliminary step is to provide easy assembly for the operator. Mount 300 is thus designed with a narrow waist 520 that allows for clipping of flange 505 on slab 506. Stress-free final attachment of the clip is enabled with the slabs 510 and 512 located on mount 300. Flexible flange 513 and 511 located on clip 500 attach on the three slabs providing the full attachment as needed. To distribute the stress originating by clip 500, three studs 515 located on the top surface of ferrule 400 are used.

The assembled device is shown in FIG. 6B. Because of its simplicity, the clip is snapped-on using either manual or automatic placement.

Figure 7:
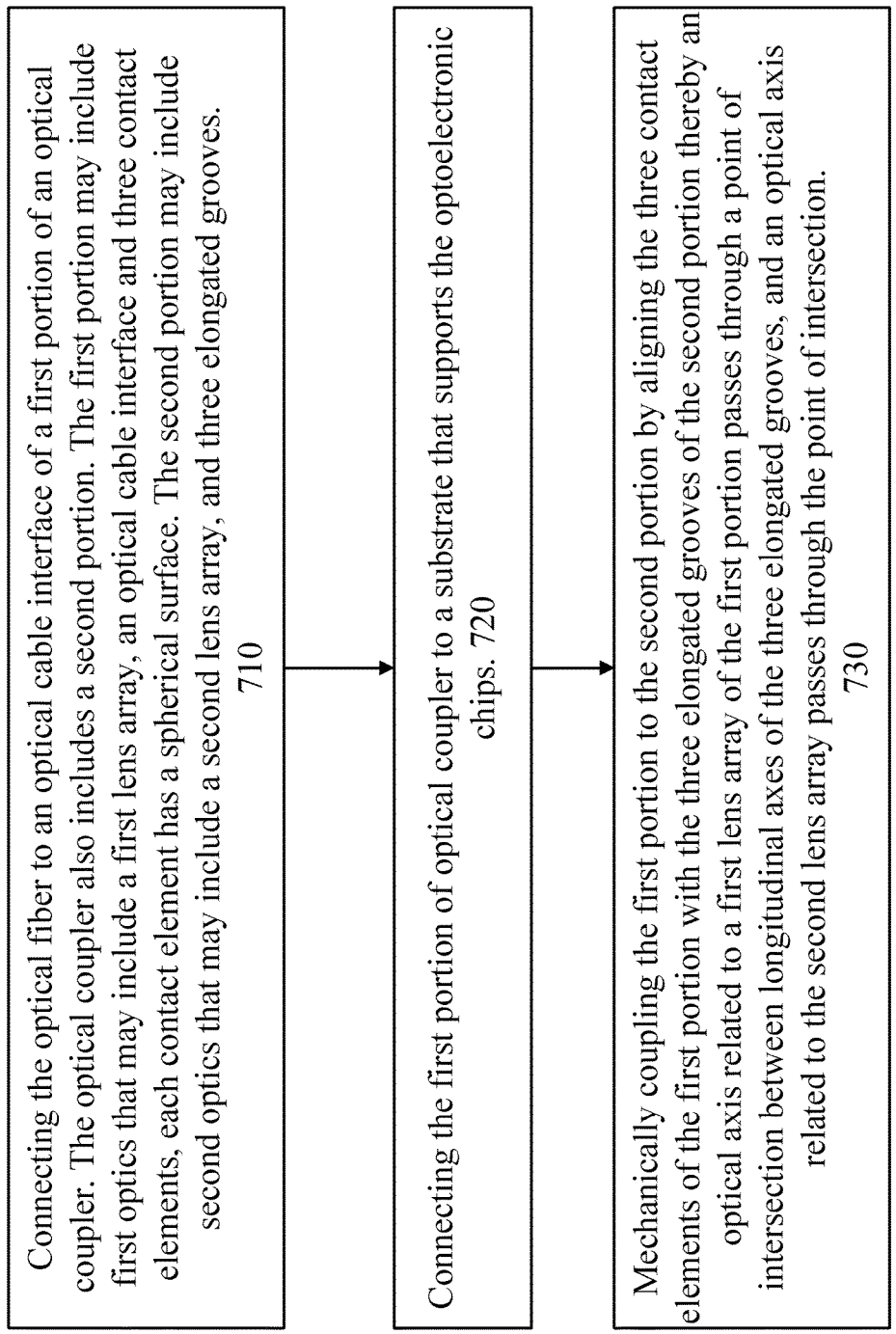
FIG. 7 is an example of a method.

FIG. 7 illustrates an example of method 700.

Method 700 may include the following steps:

a. Connecting the optical fiber to an optical cable interface of a first portion of an optical coupler. The optical coupler also includes a second portion. The first portion may include first optics that may include a first lens array, an optical cable interface and three contact elements, each contact element has a spherical surface. The second portion may include second optics that may include a second lens array, and three elongated grooves. 710. The first portion may be fiber ferrule 400. The second portion may be optical mount 300.

b. Connecting the first portion of optical coupler to a substrate that supports the optoelectronic chips. 720.

c. Mechanically coupling the first portion to the second portion by aligning the three contact elements of the first portion with the three elongated grooves of the second portion thereby an optical axis related to a first lens array of the first portion passes through a point of intersection between longitudinal axes of the three elongated grooves, and an optical axis related to the second lens array passes through the point of intersection. 730.

Method 700 is a passive method in the sense that successful alignment may be achieved when following steps 710, 720 and 730—and there is no need to monitor the alignment process by activating the electro-optical circuits and any other circuit. It is noted that method 700 may include actively monitoring the alignment—but this is not necessarily so.

The number of optical paths may equal to the number of optical couplers or may differ from the number of optical couplers. An optical path is associated with a single fiber and/or a single laser. An array of photodiodes may be "covered" by a single optical coupler or multiple optical couplers. An array of lasers may be "covered" by a single optical coupler or multiple optical couplers.

The same optical coupler may be used for both receive path and transmit path.

A single optical coupler may be positioned in both (a) one or more transmit optical paths and (ii) one or more receive optical paths. Alternatively, a separate optical coupler may be positioned in one or more transmit optical paths and a separate optical coupler may be positioned in one or more receive optical paths.

Figure 8:
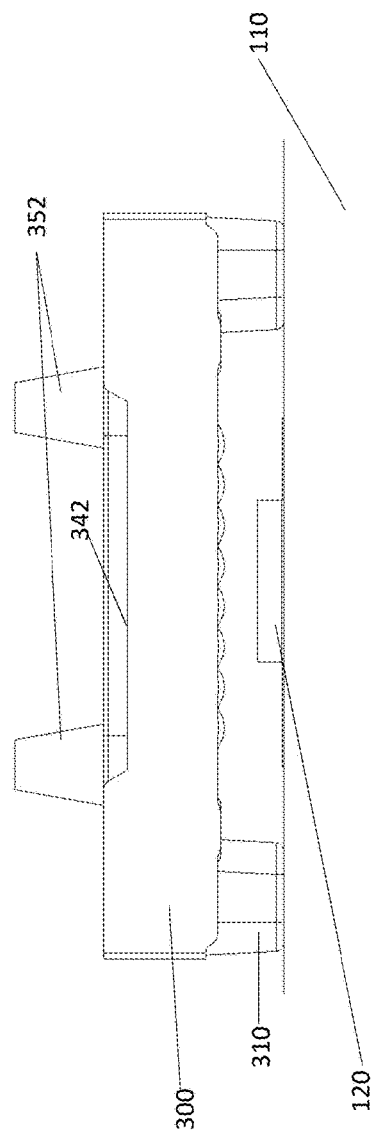
FIG. 8 illustrates an optical coupler.

FIG. 8 illustrates optical mount 300 that is positioned at transmit paths of multiple optoelectronic chips 120. The optoelectronic chips 120 are supported by substrate 110. The optical mount 300 is shown as including three legs 310, guide pins 352 and recess 342.

Figure 9:
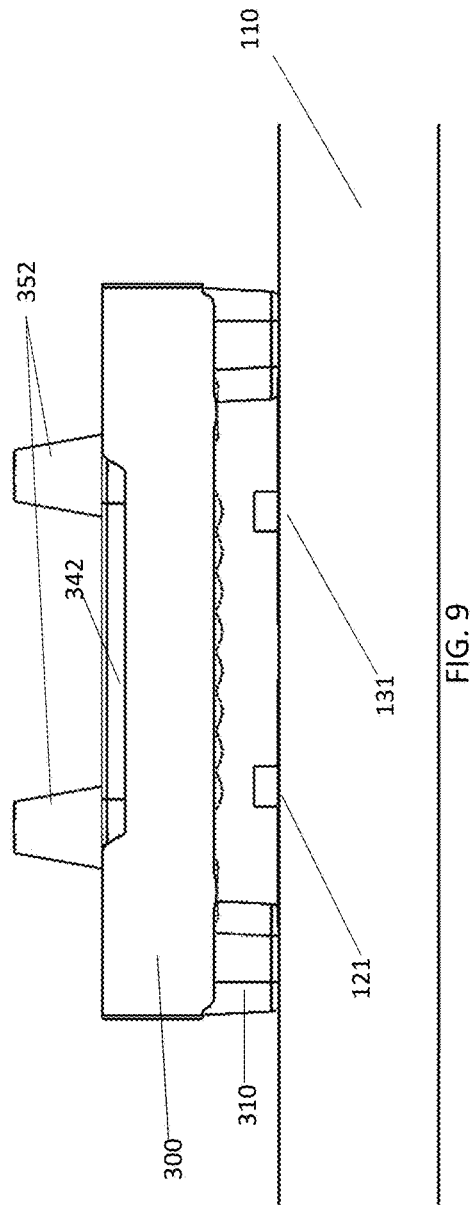
FIG. 9 illustrates an optical coupler.

FIG. 9 illustrates optical mount 300 that is positioned at a transmit path of optoelectronic chip 121 and at a receive path of PD 131. The optoelectronic chips 120 are supported by substrate 110. The optical mount 300 is shown as including three legs 310, guide pins 352 and recess 342.

It has been found that the

Figure 10:
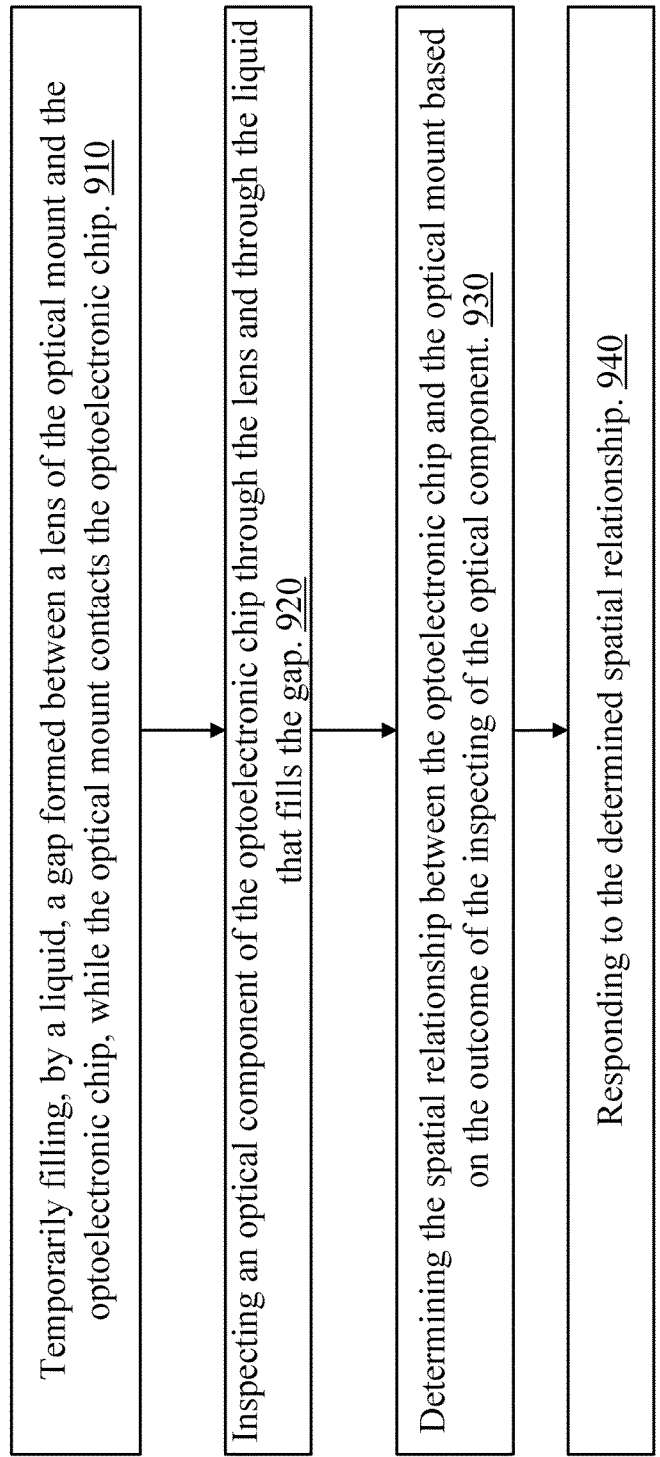
FIG. 10 illustrates an example of a method.

FIG. 10 illustrates an example of method 900.

Method 900 may be executed after the optoelectronic chip is connected to the optical mount or before the optoelectronic chip is connected to the optical mount.

Method 900 may be executed during a manufacturing process of an apparatus that includes the optoelectronic chip and the optical mount, or at any other time.

Method 900 may be executed with or without human intervention, and may improve the quality control of the apparatus.

Method 900 is for determining a spatial relationship between an optoelectronic chip and an optical mount.

The spatial relationship may reflect an alignment or a misalignment between the optoelectronic chip and the optical mount.

Method 900 may include steps 910, 920, 930 and 940.

Step 910 may include temporarily filling, by a liquid, a gap formed between a lens of the optical mount and the optoelectronic chip, while the optical mount contacts the optoelectronic chip.

The gap may be filled for a period that is long enough to execute step 920. Non-limiting examples of a long enough duration are 10-200 seconds, and the like.

The liquid may be a volatile liquid that may evaporate within less than a minute, between one and 10 minutes, within less than an hour and the like. A volatile liquid eases the process of removing the liquid from the optoelectronic chip and the optical mound after the completion of method 900—thereby reducing any aggregation of the liquid and/or simplifying the inspection process by not having to remove the fluid.

The volatile liquid may be alcohol or may differ from alcohol.

Step 910 may include positioning one or more drops of the liquid at a vicinity of the lens and allowing capillary forces to move the one or more drops towards the lens.

The refractive index of the lens substantially equals a refractive index of the liquid. Substantially equals may include differences up to 10%, 20%, and the like between these refractive indexes.

Step 920 may include inspecting an optical component of the optoelectronic chip through the lens and through the liquid that fills the gap.

The optical components may be an active optical component, a passive optical component, a transmitting component, a receiving component, a vertical-cavity surface-emitting laser, a p-i-n photodiode, and the like.

The inspection may include using an inspection system to acquire one or more images of the optical components using a collection path that passes through the lens and the liquid.

The inspection system may be a microscope or any other system that is configured to image the optical component.

The inspection system may be integrated with, belong to or communicate with a manufacturing tool such as a pick-and-place machine.

The collection path may be vertical to the surface of the optoelectronic chip—but this is not necessarily so.

The collection path may overlap a transmission path of an optical components that is a transmitter, may not overlap the transmission path, or have any spatial relationship with the transmission path.

The collection path may overlap a reception path of an optical components that is a receiver, may not overlap the reception path, or have any spatial relationship with the reception path.

Step 930 may include determining the spatial relationship between the optoelectronic chip and the optical mount based on the outcome of the inspecting of the optical component.

Step 930 may include processing an image to determine a location of a unique feature of the optical component, searching for the border of the optical component, and the like.

For example—step 930 may include determining that the optical component is located in its expected location and that the optical mount and the optoelectronic chip are aligned. Yet for another example—step 930 may include determining that the optical component is located outside its expected location and that the optical mount and the optoelectronic chip are not aligned.

It should be noted that the alignment may be determined based on the locations of multiple lenses—as the optical mount and the optoelectronic chip are three dimensional objects—and even when one optical component is positioned at its expected locations—other one optical components may be positioned outside their expected locations.

Accordingly—steps 910, 920, 930 and 940 may be executed in relation to additional lenses and additional optical components.

The same fluid may or may not be used for multiple iterations of steps 920 and 930.

Step 940 may include responding to the determined spatial relationship of step 930.

Step 940 may include at least one out of (a) fixing a misalignment between the optoelectronic chip and the optical mount based on the outcome of the inspecting of the optical component, (b) determining a quality of an apparatus that comprises the optoelectronic chip and the optical mount based on the outcome of the inspecting of the optical component, (c) determining a manufacturing flaw, and the like.

Figure 11:
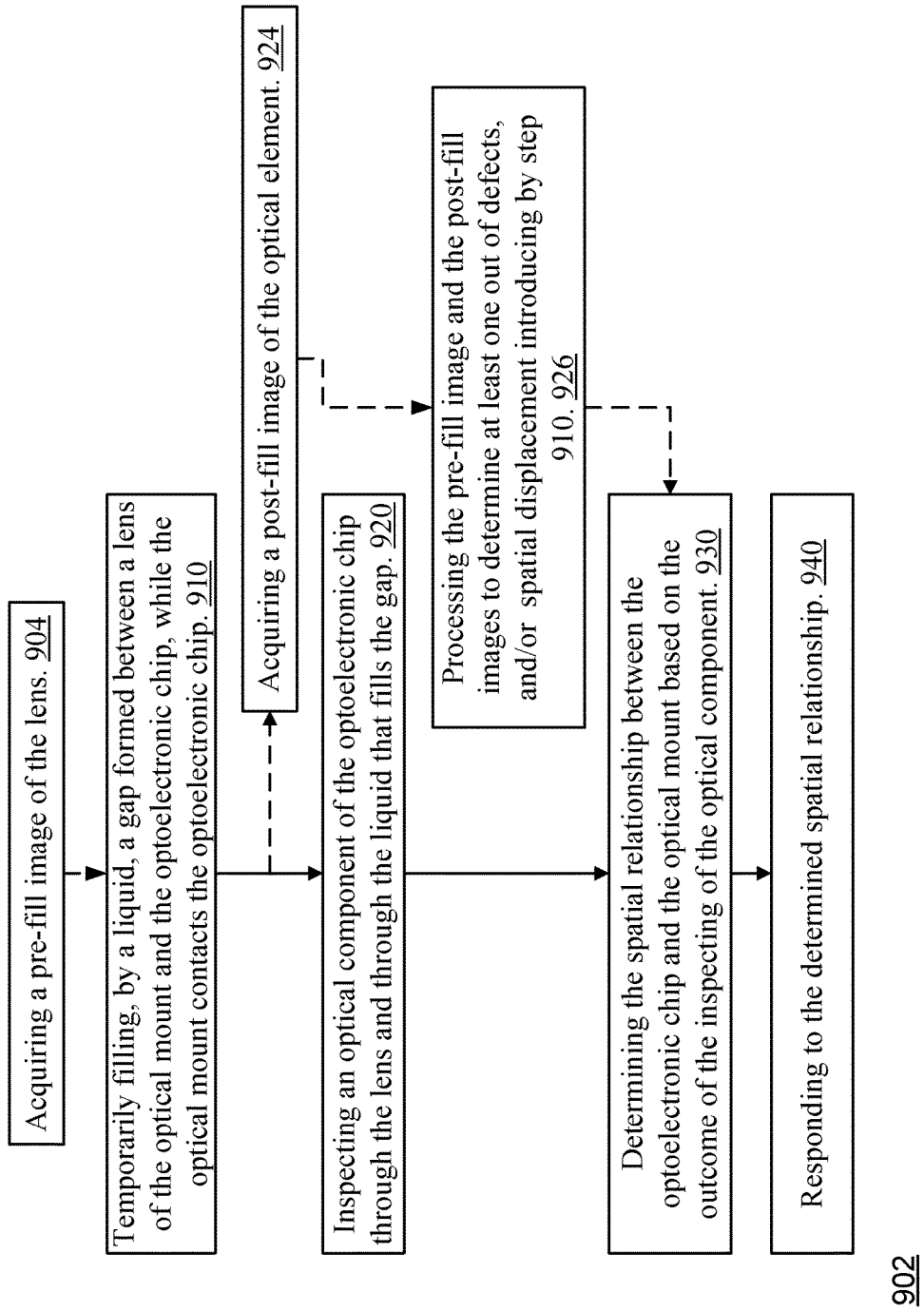
FIG. 11 illustrates an example of a method.

FIG. 11 illustrates an example of method 902.

Method 902 differs from method 900 by including steps 904, 924 and 926, in addition to steps 910, 920 and 930, Step 902 precedes step 910.

Step 902 may include acquiring a pre-fill image of the lens, before the temporarily filling, by the liquid, of the gap. The pre-fill image may be of the lens and the optical element—although without the liquid the image of the optical element may be blur.

Step 924 followed step 920.

Step 924 may include acquiring a post-fill image of the optical element, after the temporarily filling, by the liquid, of the gap. The post-fill image may be of the lens—especially the boundary of the lens.

Steps 902 and 924 may be followed by step 926 of processing the pre-fill image and the post-fill images to determine at least one out of defects, and/or spatial displacement introducing by step 910. For example—the processing may compare between the location of any unique feature in these images—such as the location of a border of the lens in these images.

If a spatial displacement is found—step 926 is followed by adjusting, amending or compensating the spatial relationship (for example—during step 930) between the optoelectronic chip and the optical mount.

Figure 12:
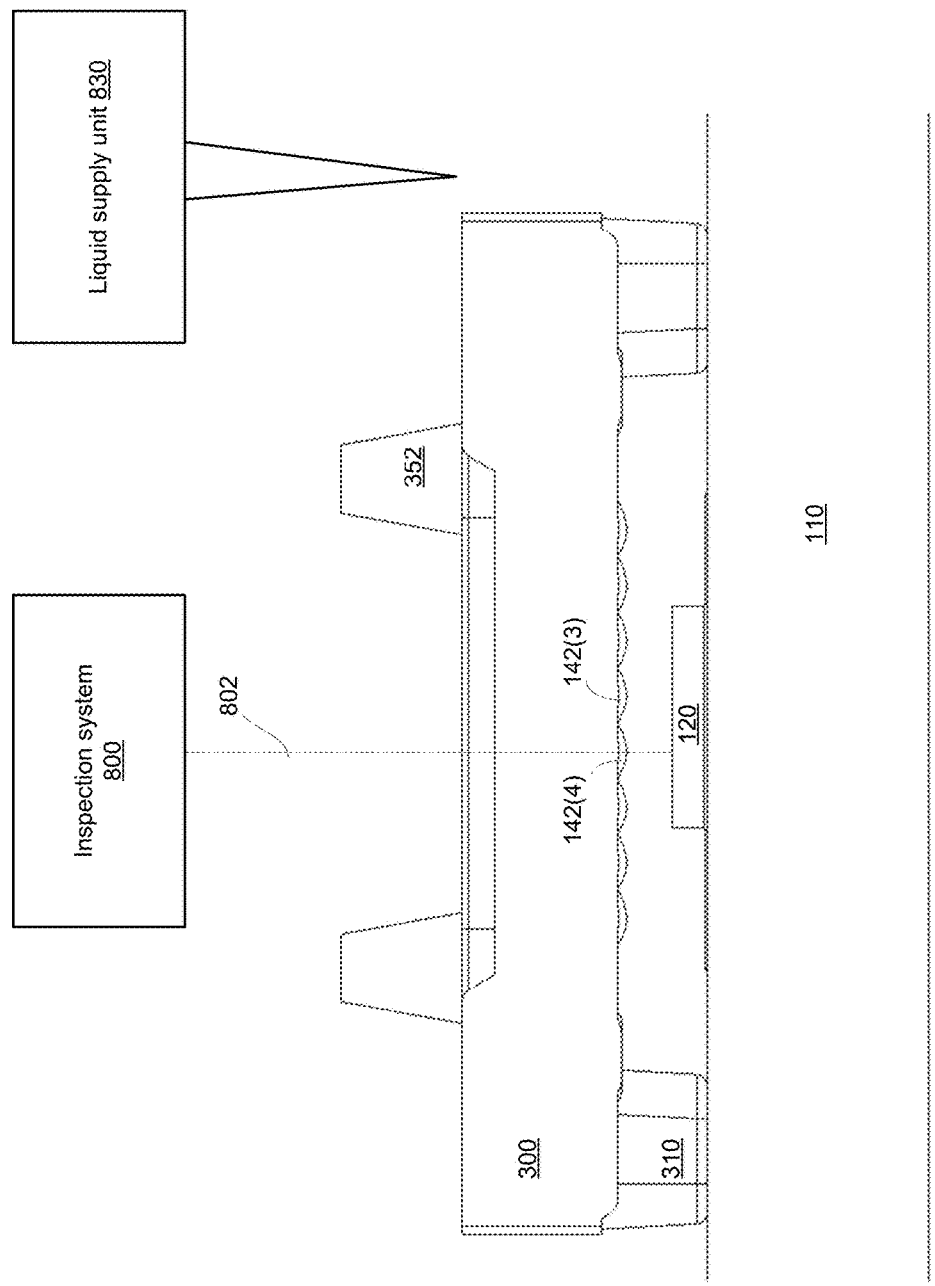
FIG. 12 illustrates an inspection system, a liquid supply unit, an optical mount and multiple optoelectronic chips.

FIG. 12 illustrates an inspection system 800, a liquid supply unit 830 and an optical mount 300 that is positioned at transmit paths of multiple optoelectronic chips 120. The optoelectronic chips 120 are supported by substrate 110. The optical mount 300 is shown as including three legs 310, guide pins 352 and recess 342.

The optical axis 802 of the inspection system 800 passes through a lens 142(3) and "crosses" one of the optoelectronic chips—falls on an optical component. The optical axis 802 is vertical—although it may deviate from vertical.

In FIG. 12 the gap between the optical mount 300 and the multiple optoelectronic chips 120 is not filled with fluid—and the image of optical component may be blur.

Figure 13:
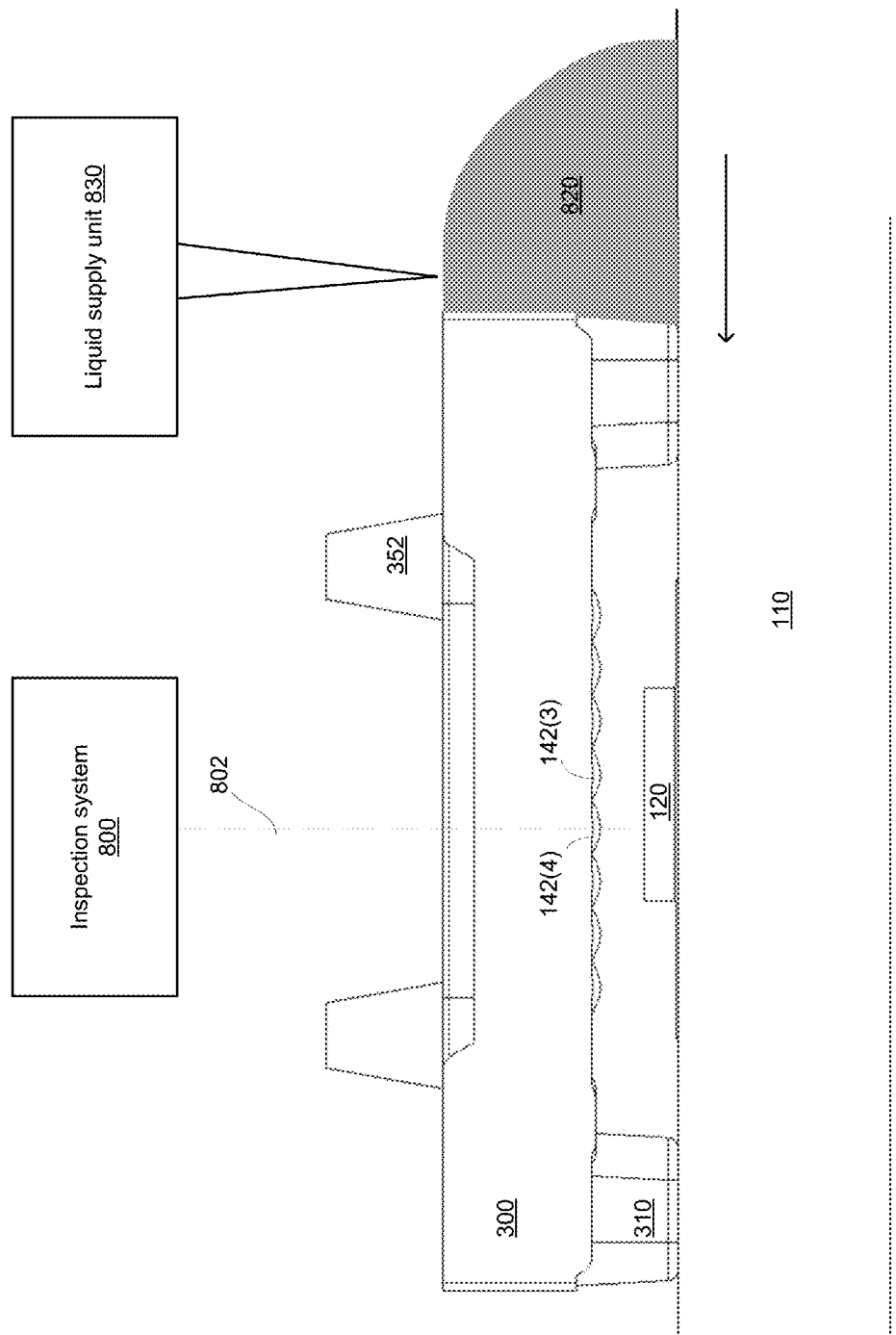
FIG. 13 illustrates an inspection system, a liquid supply unit, an optical mount and multiple optoelectronic chips.

FIG. 13 illustrates a beginning of the filling process—a drop 820 is deposited to the side of the optical mount 300.

Figure 14:
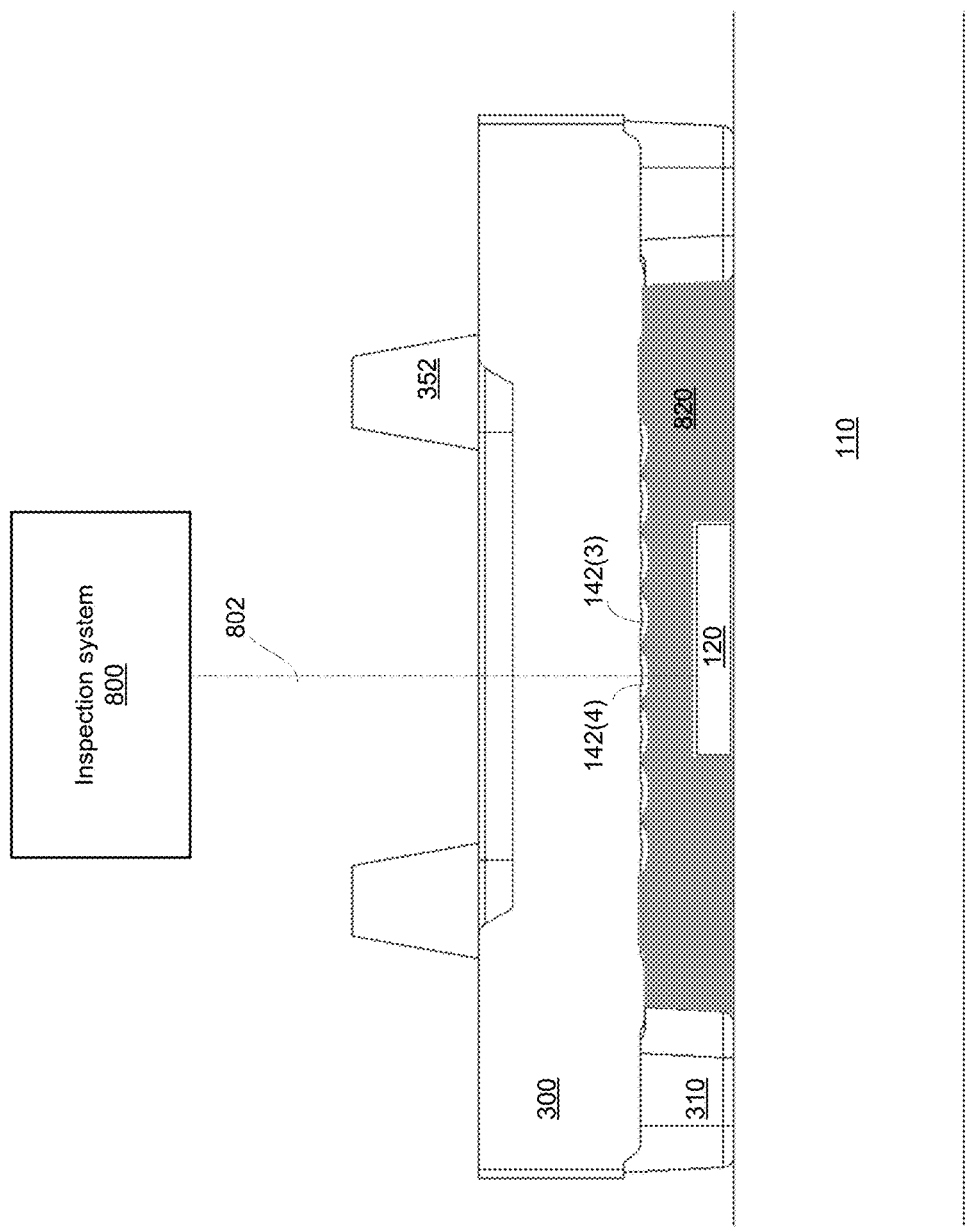
FIG. 14 illustrates an inspection system, a liquid supply unit, an optical mount and multiple optoelectronic chips.

In FIG. 14 the gap between the optical mount 300 and the multiple optoelectronic chips 120 is filled with fluid 820—and the image of optical component may be clear and not blurred.

It should be noted that the fluid should fill enough of the gap so that collection path segment between lens 142(4) and the optical component passes only through the liquid. No all the gap between the entire optical mount and all the optoelectrical chips needs to be filled.

Figure 15:
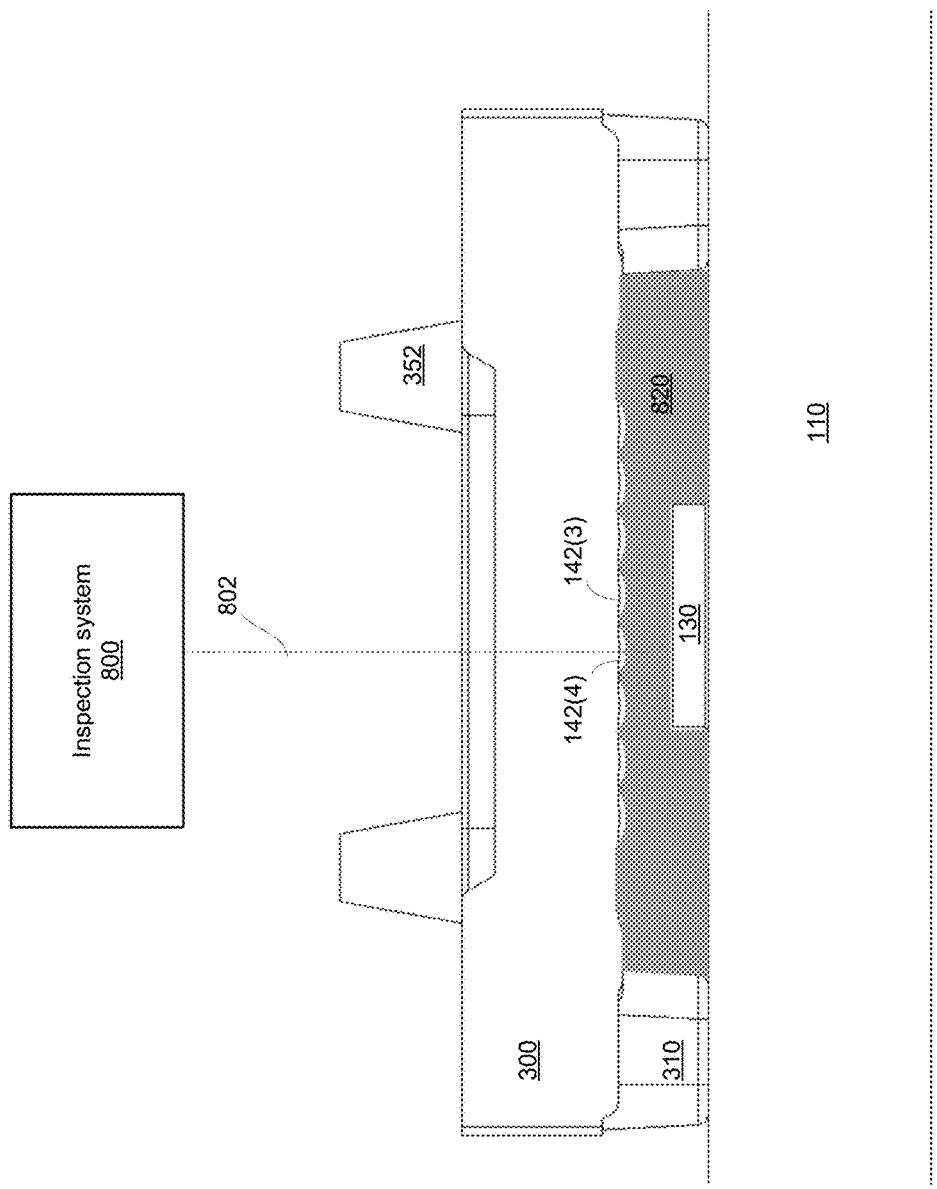
FIG. 15 illustrates an inspection system, a liquid supply unit, an optical mount and multiple optoelectronic chips.

FIG. 15 illustrates an inspection system 800, a liquid supply unit 830 and an optical mount 300 that is positioned at reception paths of multiple optoelectronic chips 120.

The optoelectronic chips 120 are supported by substrate 110. The optical mount 300 is shown as including three legs 310, guide pins 352 and recess 342.

In FIG. 15 the gap between the optical mount 300 and the multiple optoelectronic chips 120 is filled with fluid—and the image of optical component may be clear and not blurred.

It should be noted that the fluid should fill enough of the gap so that collection path segment between lens 142(4) and the optical component passes only through the liquid.

Figure 16:
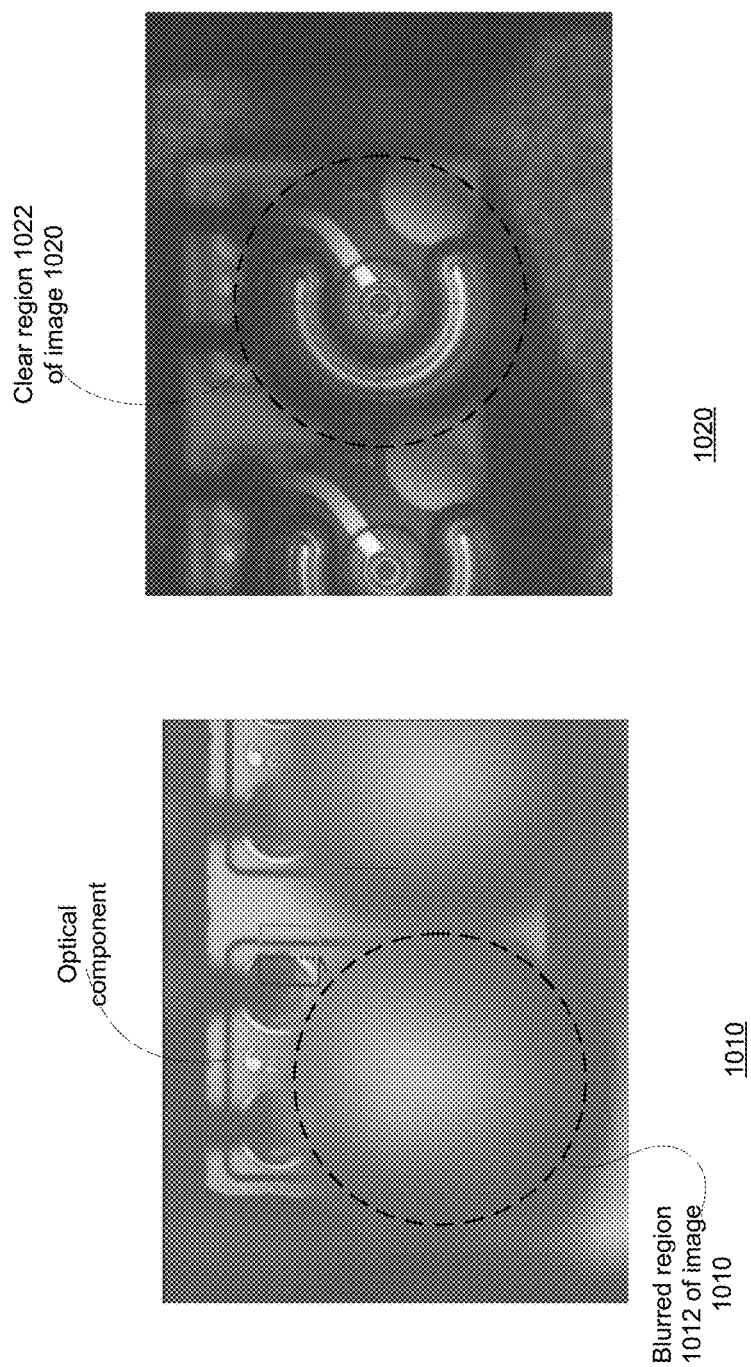
FIG. 16 illustrates images of an optical component.

FIG. 16 illustrates an image 1010 of an optical component obtained with an empty gap—the image includes a blurred region 1012 (that corresponds to the microlens), and an image 1020 of an optical component (image 1020 includes a clear region 1022) obtained with gap that is filled with liquid.

The terms "including", "comprising", "having", "consisting" and "consisting essentially of" are used in an interchangeable manner. For example—any module or chip may include at least the components included in the figures and/or in the specification, only the components included in the figures and/or the specification.

Any reference to the phrases "may" or "may be" should be applied to the phrases "may not" or "may not be".

The phrase "and/or" means additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between blocks are merely illustrative and that alternative embodiments may merge blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for determining a spatial relationship between an optoelectronic chip and an optical mount, the method comprises:
   temporarily filling, by a liquid, a gap formed between a lens of the optical mount and the optoelectronic chip, while the optical mount contacts the optoelectronic chip;
   inspecting an optical component of the optoelectronic chip through the lens and through the liquid that fills the gap; and
   determining the spatial relationship between the optoelectronic chip and the optical mount based on the outcome of the inspecting of the optical component.

2. The method according to claim 1, wherein the liquid is a volatile liquid.

3. The method according to claim 1, wherein the liquid is alcohol.

4. The method according to claim 1, wherein the filling comprises positioning one or more drops of the liquid at a vicinity of the lens and allowing capillary forces to move the one or more drops towards the lens.

5. The method according to claim 1, wherein a refractive index of the lens substantially equals a refractive index of the liquid.

6. The method according to claim 1, comprising:
   acquiring a pre-fill image of the lens, before the temporarily filling, by the liquid, the gap; and
   acquiring a post-fill image of the lens, after the temporarily filling, by the liquid, the gap.

7. The method according to claim 6, comprising:
   determining, based on the pre-fill image and the post-fill image, a spatial deviation introduced by the temporarily filling the gap by the liquid; and
   wherein the determining the spatial relationship comprises compensating for the spatial deviation introduced by the temporarily filling the gap by the liquid.

8. The method according to claim 6, comprising detecting defects based on a comparison between the pre-fill image and the post-fill image.

9. The method according to claim 1, wherein the optical component is a vertical-cavity surface-emitting laser.

10. The method according to claim 1, wherein the optical component is a p-i-n photodiode.

11. The method according to claim 1, comprising inspecting another optical component of the optoelectronic chip through the lens and through the liquid that fills the gap; and wherein the determining of the spatial relationship is further based on an outcome of of the inspecting of the additional optical component.

12. The method according to claim 1, comprising fixing a misalignment between the optoelectronic chip and the optical mount based on the outcome of the inspecting of the optical component.

13. The method according to claim 1, comprising determining a quality of an apparatus that comprises the optoelectronic chip and the optical mount based on the outcome of the inspecting of the optical component.

* * * * *